US009395185B2

(12) United States Patent  (10) Patent No.: US 9,395,185 B2
Utukuri et al.  (45) Date of Patent: Jul. 19, 2016

(54) MODULAR POSITION SENSING SYSTEMS AND METHODS

(71) Applicant: Baanto International Ltd., Mississauga (CA)

(72) Inventors: Avanindra Utukuri, Mississauga (CA); Jonathan Clarke, Toronto (CA)

(73) Assignee: Baanto International Ltd., Mississauga (CA)

( * ) Notice: Subject to any disclaimer, the term of this patent is extended or adjusted under 35 U.S.C. 154(b) by 290 days.

(21) Appl. No.: 13/705,158

(22) Filed: Dec. 4, 2012

(65) Prior Publication Data

US 2013/0240707 A1 Sep. 19, 2013

Related U.S. Application Data

(63) Continuation of application No. PCT/CA2011/000667, filed on Jun. 9, 2011.

(60) Provisional application No. 61/353,192, filed on Jun. 9, 2010, provisional application No. 61/393,928, filed on Oct. 17, 2010.

(51) Int. Cl.
*G01C 21/00* (2006.01)
*G01V 8/20* (2006.01)

(52) U.S. Cl.
CPC . *G01C 21/00* (2013.01); *G01V 8/20* (2013.01)

(58) Field of Classification Search
CPC .............................. G06F 3/0428; G06F 3/0421
See application file for complete search history.

(56) References Cited

U.S. PATENT DOCUMENTS

| 6,297,498 | B1 | 10/2001 | Shteynberg et al. |
| 6,635,862 | B2 | 10/2003 | Shteynberg et al. |
| 8,698,060 | B2 * | 4/2014 | Kitagawa ............... 250/206.1 |
| 9,001,086 | B1 * | 4/2015 | Saini ....................... 345/175 |
| 2002/0075243 | A1 | 6/2002 | Newton |
| 2004/0149892 | A1 | 8/2004 | Akitt et al. |
| 2009/0262097 | A1 | 10/2009 | Chen et al. |
| 2010/0079412 | A1 * | 4/2010 | Chiang et al. ............ 345/175 |

FOREIGN PATENT DOCUMENTS

| JP | 2001-159955 A | 6/2001 |
| JP | 2001-228974 A | 8/2001 |
| JP | 2001-325073 A | 11/2001 |
| WO | 2010/145038 A1 | 12/2010 |

OTHER PUBLICATIONS

International Preliminary Report on Patentability for PCT/CA2011/000667, published Dec. 10, 2012.
Written Opinion of the ISR for PCT/CA2011/000667, published Sep. 20, 2011.

(Continued)

*Primary Examiner* — Tony Ko

(57) ABSTRACT

Various embodiments of a modular position sensing system and method for using the system are described. The system may be used to detect the position of one or more radiation blocking objects in a sensing region. The sensing region may overlie a surface such as a wall, whiteboard, display screen or a modular display screen. When used with a modular display screen, the system may include system modules dimensions to correspond to display modules used to form the modular display screen.

11 Claims, 9 Drawing Sheets

(56) References Cited

OTHER PUBLICATIONS

Patent Abstracts of Japan, English Translation of Abstract of JP-2001-325073, published Nov. 22, 2001.

Patent Abstracts of Japan, English Translation of Abstract of JP-2001-228974, published Aug. 24, 2001.

Patent Abstracts of Japan, English Translation of Abstract of JP-2001-159955, published Jun. 22, 2001.

* cited by examiner

MODULAR POSITION SENSING SYSTEMS AND METHODS

FIELD

The described embodiments relate to position sensing systems and methods. More particularly, they relate to systems and methods for sensing the positions of one or more objects in a space or on a plane.

BACKGROUND

Large display panels may be formed of display modules that may be combined in various combinations. The various combinations provide differently sized display panels. Known systems and methods for adding touch functionality to such panels are cumbersome and costly as they are not typically designed for use with combinations of display modules.

A similar problem can arise when it is desired to add a touch functionality to other surfaces of various shapes and configurations.

It is desirable to provide a system for sensing objects, such as fingers, styluses and other radiation blocking objects, that is suitable for use with surfaces and in sensing regions have various shapes and configurations.

SUMMARY

Exemplary embodiments described herein provide details relating to systems and methods for determining the position of one or more radiation blocking objects in relation to various radiation sources and radiation sensors in a sensing region. In some embodiments, the sensing region may be shaped to correspond to an underlying device such as whiteboards, display monitors and other devices. In some embodiments, the systems may include or be used with an underlying surface such as a whiteboard, a wall, the surface of a display screen or another generally planar surface. In some embodiments, the display screen may be assembled from an array of display modules. The radiation sources may emit radiation in the visible light spectrum or in other spectrums, such as the ultraviolet or infrared spectrums. The embodiments described herein are exemplary only and other implementations and configurations are also possible.

In a first aspect, some embodiments provide: a modular position sensing system for sensing the position of a radiation blocking object in a sensing region, the system comprising: a system controller; and a plurality of system modules coupled to the system controller, wherein the system modules at least partially enclose the sensing region, wherein the system modules include one or more radiation source and one or more radiation sensors.

In some embodiments, the system controller is coupled to each of the system modules.

In some embodiments, the system controller is physically coupled to at least some of the system modules.

In some embodiments, the system controller is coupled to at least some of the system modules through a wireless communication system.

In some embodiments, the system further includes a system communication bus for allowing the system controller to communicate with each of the modules.

In some embodiments, each module includes one or more connectors for coupling to adjacent modules, the system communication bus includes the interconnections between modules.

In some embodiments, each module includes a module controller coupled to the system controller, wherein: at least some of the module controllers are configured to control the operation of at least one radiation sensor in response to control instruction received from the system controller; and at least some of the module controllers are configured to control the operation of at least one radiation source in response to control instruction received from the system controller.

In some embodiments, each module includes a module controller coupled to the system controller and wherein each module controller controls the operation of at least one radiation source in response to control instruction received from the system controller.

In some embodiments, the system modules include a plurality of modules selected from a combination of modules selected from the group consisting of: edge sensor modules; inside corner sensor modules; outside corner sensor modules; edge radiation source modules; inside corner radiation source modules; outside corner radiation source modules; edge mixed type modules; inside corner mixed type modules; outside corner mixed type modules; and edge spacer modules.

In some embodiments, the system modules include a plurality of modules selected from a combination of modules selected from the group consisting: radiation sensor modules; radiation source modules; and reflector modules.

In some embodiments, dimensions of at least some of the system modules are recorded in a memory accessible In some embodiments, the sensing region overlies a surface.

In some embodiments, the sensing region overlies a surface of a display screen.

In some embodiments, the sensing region overlies a surface of a modular display screen.

In some embodiments, at least some dimensions of at least some of the system modules correspond to one or more dimensions of display modules forming the modular display screen.

In some embodiments, at least some of the system modules include one or more diffusers for diffusing radiation emitted by one or more radiation sources.

In some embodiments, the controller includes an interface for coupling the system to an external device.

In some embodiments, adjacent system modules are coupled to one another electrically and mechanically.

In some embodiments, the system

In some embodiments, the sensing region is generally rectangular and wherein at least two radiation sensors are positions adjacent a first edge of the sensing region and wherein a plurality of radiation sources are positioned adjacent the remaining edges of the sensing region.

In another aspect, some embodiments provide a method of operating a modular position sensing system, the method comprising: providing a set of system modules adjacent to a sensing region; determining the positions of a plurality of radiation sources mounted to at least some of the system modules; determining the position of two or more radiations sensors mounted to at least one of the system modules; assembling a radiation intensity signal corresponding to each of the radiation sensors; and estimating the position of a radiation blocking object based on the radiation intensity signals.

In some embodiments, determining the positions of the radiation sources includes determining the positions of one or more system modules and determining the positions of radiation sources mounted to those system modules based on dimensions of at least some of the system modules.

In some embodiments, determining the positions of the radiation sensors includes determining the positions of one or more system modules and determining the positions of radiation sensors mounted to those system modules based on dimensions of at least some of the system modules.

In some embodiments, the method includes sequentially determining an order in which the system modules are coupled together and determining the positions of the radiation sources and the radiation sensors in accordance with the order of the system modules.

In some embodiments, each radiation intensity signal corresponding to a radiation sensor is assembled by sequentially sampling a radiation intensity level from the radiation sensor while at least some of the radiation sources are sequentially activated.

In some embodiments, the radiation intensity signals are assembled contemporaneously.

In some embodiments, at least one of the radiation sources is activated separately at different intensities to generate a radiation intensity signal corresponding to a first radiation sensor and a radiation intensity signal corresponding to the second radiation sensor.

In some embodiments, the radiation intensity signals are assembled sequentially.

In some embodiments, a first radiation intensity signal corresponding to the first radiation sensor is assembled and then a second radiation intensity signal corresponding to the second radiation sensor.

In some embodiments, an external device is coupled to the system controller at an interface.

In some embodiments, the method includes reporting the position of the one or more radiation blocking objects to the external device.

These and other aspects of various embodiments are further described below in the description of various example embodiments.

The Figures are merely illustrative of the embodiments shown and described below. They are not limiting and are not drawn to scale.

DESCRIPTION OF EXAMPLE EMBODIMENTS

Figure 1:
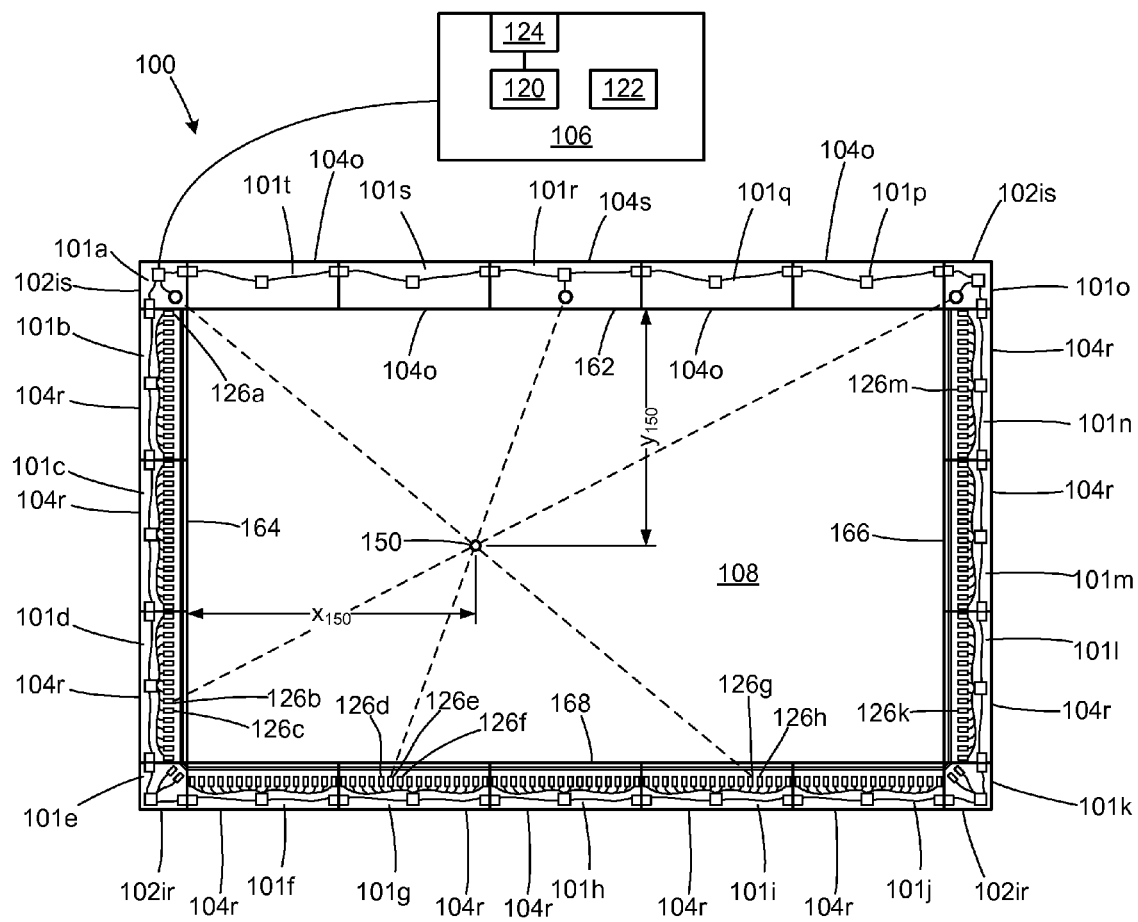
FIG. 1 illustrates a first example modular position sensing system.

Reference is first made to FIG. 1, which illustrates a first modular position sensing system 100. System 100 includes a plurality of system modules 101, including corner modules 102 and edge modules 104. System 200 also includes a system controller 106. The edge and corner modules are assembled together to at least partially enclose a sensing region 108. Typically, sensing region 108 will overlie a surface 110.

System controller 106 controls the operation of system 100. System controller 106 includes a processor 120, which may be any type of device or component capable of operating system 100, such as a hardware component, a software component or a component including both hardware and software or firmware or both. For example, processor 120 may be a microprocessor, microcontroller, gate array or any type of data processing or computing device. The processor can be programmed or configured to operate system 100 and its components and to communicate with external devices. System controller 106 may also include a memory 122, which may be accessed by processor 120. Processor 120 controls the operation of system controller 106 and system 100. Instructions may be recorded in the memory 122, and may be loaded into the processor to configure the processor to perform control, data processing, data transformation and communication operations for controlling the operation of the system controller 106 and the system 100 as described below. In addition to instructions, data may be recorded in memory 122.

System controller 106 includes an interface 124, which in this embodiment is a universal serial bus port. Processor 120 is coupled to interface 124. External devices (not shown) may be coupled to processor 120 through interface 124, allowing the processor to report the position of radiation blocking objects in the sensing region 108 to the external devices and to receive control instructions and data from the external devices. In other embodiments, the interface may be any type of communication interface. For example, interface 124 may be an analog interface or a digital data interface such as a serial data port or a parallel data port.

A system according to the present invention may include various types of modules including radiation source modules, sensor modules and mixed type modules.

System 100 includes corner radiation source modules 102$r$ and corner sensor modules 102$s$, edge radiation source modules 104$r$, edge sensor modules 104$s$ and edge spacer modules 104$o$. Each module is coupled electrically and mechanically to one or more adjacent modules.

In system 100, the following modules are assembled in sequence, starting at system module 101$a$ and moving counterclockwise, to surround the sensing region 108:

TABLE 1

| Module | Module type |
|---|---|
| 101a | Inside corner sensor module 102is |
| 101b | Edge radiation source module 104r |
| 101c | Edge radiation source module 104r |
| 101d | Edge radiation source module 104r |
| 101e | Inside corner radiation source module 102ir |
| 101f | Edge radiation source module 104r |
| 101g | Edge radiation source module 104r |
| 101h | Edge radiation source module 104r |

TABLE 1-continued

| Module | Module type |
| --- | --- |
| 101i | Edge radiation source module 104r |
| 101j | Edge radiation source module 104r |
| 101k | Inside corner radiation source module 102ir |
| 101l | Edge radiation source module 104r |
| 101m | Edge radiation source module 104r |
| 101n | Edge radiation source module 104r |
| 101o | Inside corner sensor module 102is |
| 101p | Edge spacer module 104o |
| 101q | Edge spacer module 104o |
| 101r | Edge sensor module 104s |
| 101s | Edge spacer module 104o |
| 101t | Edge spacer module 104o |

The system modules 101 form a frame 160 that has a top side 162, a left side 164, a right side 166 and a bottom side 168.

Figure 2:
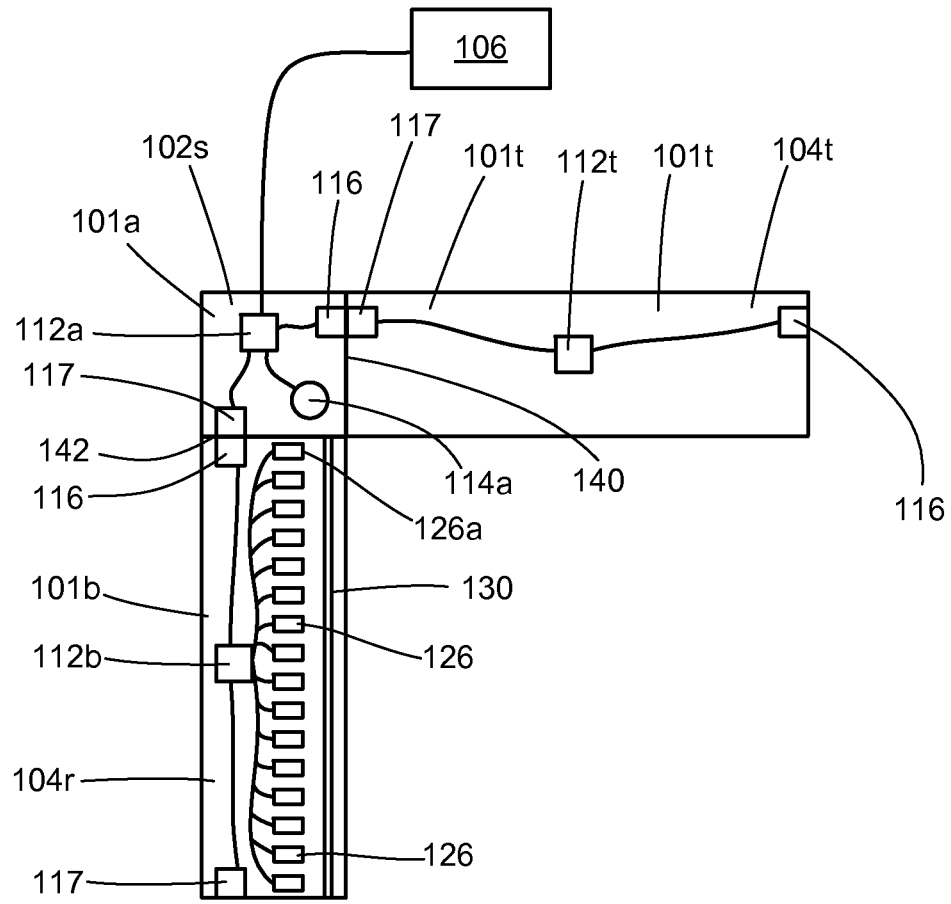
FIG. 2 illustrates some components of the system of FIG. 1.

Referring to FIG. 2, system modules 101a, 101b and 101t are illustrated.

Each system module 101 in system 100 includes an upstream inter-module connector 116 and a downstream inter-module connector 117. The downstream connector 117 of each module is coupled to the upstream connector 116 of an adjacent system module 101.

Each system module 101 also has a module controller 112, which is connected to each of the inter-module connectors 116, 117 of the system module 101. The module controllers 112 of the system modules are coupled together through the inter-module connectors, forming a system communication bus.

The system controller 106 is also coupled to the system communication bus, and can communicate with each module controller 112 independently.

System module 101a is a corner sensor module 102is. Each corner sensor module 102is includes a module controller 112a, a radiation sensor 114a, an upstream inter-module connector 116 and a downstream inter-module connector 117. Module controller 112a is coupled to the system controller 106, radiation sensor 114a and the inter-module connectors 116, 117. In this embodiment, each corner sensor module 102is couple two adjacent modules that are positioned at right angles to one another. The upstream system module 101t that is coupled to the upstream connector 116 of system module 101a is oriented at a 90° angle to downstream system module 101b that is couple to the downstream connector 117 of system module 101a. Sensor 114a is positioned 1 cm from edges 140, 142 of the corner sensor module 102a.

In system 100, module controller 112a of system module 101a is coupled to the system controller 106, and through module controller 112a to the system communication bus. Each module controller 112 controls the operation of its system module 101, in response to control instructions received from the system controller.

System module 101b is an edge radiation source module 104r. Each edge radiation source module 104r includes a module controller 112b, a plurality of radiation sources 126, an upstream inter-module connector 116, a downstream inter-module connector 117 and a diffuser 130. Module controller 112b is coupled to each of the radiation sources 126 and to each of the inter-module connectors 116, 117. In system 100, each edge radiation source module 104r has a length of 30 cm and has 20 radiation sources 126. The radiation sources are positioned 1.5 cm apart, with the first radiation source 126 positioned 0.75 cm from upstream system module 101a and the last radiation source 126 positioned 0.75 cm from the downstream system module 101c (FIG. 1). Referring briefly to FIG. 1, system module 101c is another edge radiation source module 104r and is similar to system module 101b. The positioning of radiation sources 126 in the edge radiation source modules 104r results in radiation sources being equally spaced 1.5 cm apart where adjacent edge radiation source modules 104r are positioned touching side by side.

Figure 3:
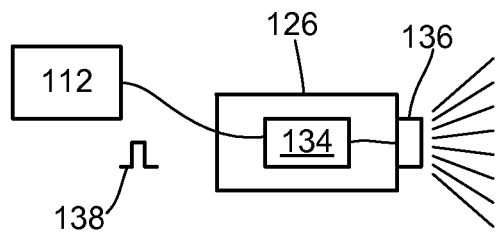
FIG. 3 illustrates a radiation source and a module controller of the system of FIG. 1.

Reference is made to FIG. 3, which illustrates a radiation source 126. Each radiation source 126 in system 100 is provided in a system module 101 and is coupled to the module controller 112 of that system module 101. Each radiation source 126 includes a radiation source driver or radiation source drive circuit 134 and a radiation emitter 136. The radiation source driver 134 is coupled to the module controller 112 to receive an emitter activation signal 138. The radiation source driver 134 activates the radiation emitter 136, which, when activated, emits radiation across at least part of sensing region 108 (FIG. 1). Each radiation source 126 in system 100 may be independently actuated. Each radiation source 126, in this embodiment, is a LED that emits radiation in the infra-red spectrum. In other embodiments, the radiation sources may be various types of sources that emit radiation in other spectrums, including the visible light spectrum and the UV spectrum.

Referring again to FIG. 2, edge radiation source module 104r includes a diffuser 130. The diffusers 130 of the radiation source modules 104r and 102ir are mounted between the radiation sources 126 of the modules and the sensing region 108.

Diffusers 130 diffuse radiation emitted by the radiation sources, thereby smoothing the amount of radiation apparently emitted along the left, bottom and right sides of the frame 160 by the radiation sources, as viewed from the radiation sensors 114. In this embodiment, the angular position of a radiation blocking object 150 relative to the left and right sides of the frame and the radiation sensors is estimated as described above in relation to system 100. The inventors have found that diffusing the radiation emitted by radiation sources 126 can provide a more accurate estimate of the radiation blocking object's position.

Various materials are suitable for use as diffusers 130, including slightly clouded or translucent plastics or other materials that diffuse but do not excessively scatter radiation from the radiation sources such that it cannot accurately be measured by the radiation sensors 114. In some embodiments, optical grade diffusers which diffuse, but do not substantially block the radiation passing through the diffuser, may be used effectively, including diffraction gratings, lenticular diffusers and lenticular diffraction gratings may be used for the diffusers. Examples of such grating are illustrated and describe in U.S. Patent Application No. 61/320,334, which is incorporated herein by this reference. The diffusers illustrated in FIG. 2 are continuous along the length of a module. In other embodiments, individual diffusers may be provided for some or all of the radiation sources.

System module 101t is an edge spacer module 104o. Edge spacer module has a module controller 112t and an upstream inter-module connector 116 and a downstream inter-module connector 117. In this embodiment, the edge spacer modules 104o do not have any radiation sources or sensors.

Each module controller 112 operates the components of its respective system module 101, under the control of the system controller 106. Each module controller communicates with the system controller 106 through the system communication bus, either directly or indirectly through the module controller 112 of other system modules 101. In system 100, module controller 112a is coupled to the system controller 106. Module controller 112a receives control instructions and data from system controller 106 and provides data to the system controller 106. Module controller 112a is coupled to module controller 112b of system module 101b (radiation source module 104r) through their respective inter-module connectors 116 as illustrated in FIG. 2. The inter-module connectors 116, 117 provide bi-directional data communication between the modules, allowing the module controllers in each system module 101 to communicate with the system controller 106 and optionally with other module controllers 112. The operation of system 100 and role of the module controller 116 is described in greater detail below.

Figure 4:
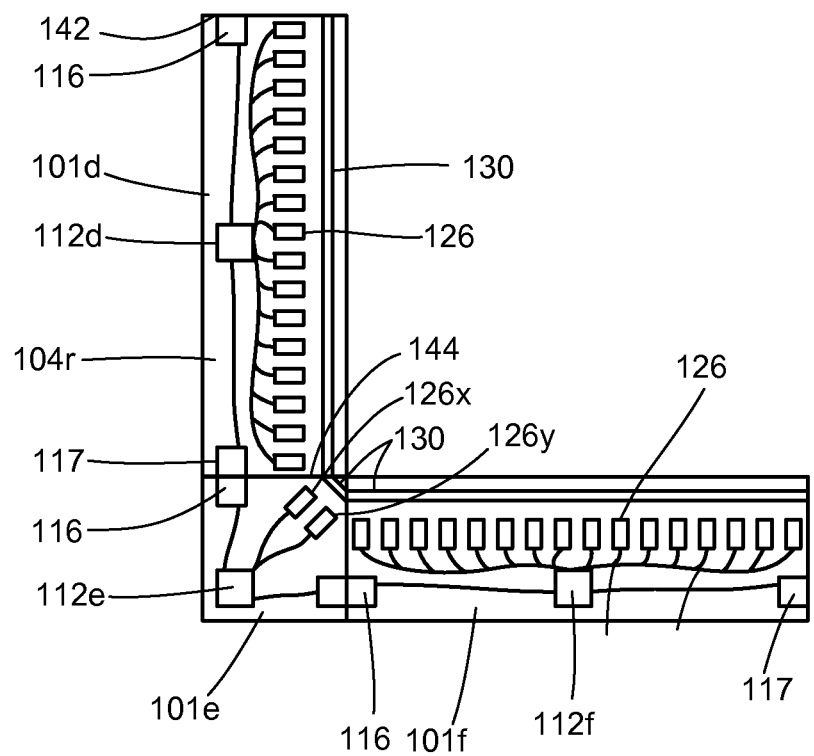
FIG. 4 illustrates a some components of the system of FIG. 1.

Reference is next made to FIG. 4, which illustrate system modules 101d-101f. System module 101d is an edge radiation source module 104r and has the same structure as system module 101b described above. Similarly 101f is also an edge radiation source module 104r and also has the same structure as system module 101b.

System module 101e is a corner radiation source module 102ir. The corner radiation source module 102ir includes a module controller 112e, a plurality of radiation sources 126, a pair of inter-module connecters 116 and a diffuser 130. Module controller 112e is coupled to each of the radiation sources 126 and to the inter-module connectors 116, 117. The radiation sources 126 of system module 101e are similar to the radiation sources 126 of edge radiation source module 101b, and are described above in relation to FIG. 3. Each of the radiation sources 126 of system module 101e may be independently activated the module controller 112e.

The radiation source 126x is positioned 1 cm from edge 144 and 2 cm from edge 146 of system module 101. Radiation source 126y is positioned 2 cm from edge 144 and 1 cm from edge 146.

Figure 5:
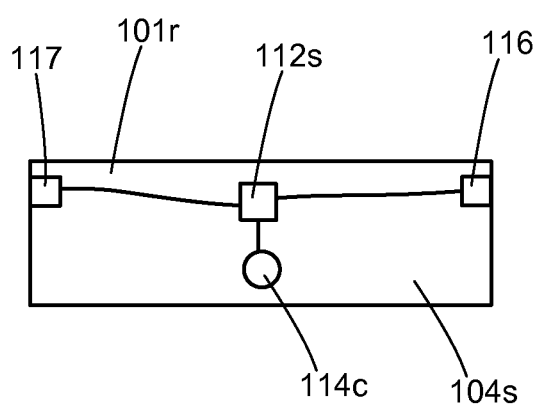
FIG. 5 illustrates an edge sensor module of the system of FIG. 1.

Reference is next made to FIG. 5, which illustrates system module 101r, which is an edge sensor module 104s. Edge sensor module 101r has a module controller 112r, a radiation sensor 114b and a pair of inter-module connectors 116, 117. Module controller 112r is coupled to and controls the operation of radiation sensor 114b, under the control of system controller 106 (FIGS. 1 and 2). Radiation sensor 114s is positioned in the middle center of the module, spaced 1 cm from the inside edge 148 adjacent the sensing region 108 (FIG. 1).

Referring again to FIG. 1, system modules 101a and 101t are coupled together such that their respective module controllers 112 are coupled together through their respective inter-module connectors 116, 117.

Reference is again made to FIG. 1. Various details about each type of system module 101 are recorded in memory 122 and are thus accessible to system processor 120. In system 100, the following information is recorded about each type of system module:

| Module type | Dimensions | Sensor/Radiation Elements and positions | Orientation between upstream and downstream inter-module connectors. |
| --- | --- | --- | --- |
| Corner sensor module 102is | | 1 radiation sensor positioned 1 cm from edges coupled to adjacent system modules | 90° turn |
| Corner radiation source module 102ir | | 2 radiation source; one source positioned 2 cm from upstream edge and 1 cm from downstream edge; other source positioned 1 cm from | 90° turn |

-continued

| Module type | Dimensions | Sensor/Radiation Elements and positions | Orientation between upstream and downstream inter-module connectors. |
| --- | --- | --- | --- |
| Edge sensor module 104s | 20 cm long | upstream edge and 2 cm from downstream edge 1 sensor positioned centrally between upstream and downstream edge, 1 cm from sensing region edge | Straight - 180° |
| Edge radiation source module 104r | 20 cm long | 30 radiation sources; sources positioned 1.5 cm apart beginning 0.75 cm from edge of module; sources positioned 2 cm from sensing region edge | Straight - 180° |
| Edge spacer module 104o | 20 cm long | None | Straight - 180° |

Referring still to FIG. 1, system 100 includes a plurality of radiation sources in system modules 101b-n. System 100 also includes three radiation sensors 114a-c. Each of the radiation sensors is sensitive to the radiation transmitted by the radiation sources. Each radiation sensor reports an intensity level corresponding to the intensity of radiation incident on the sensor to its corresponding module controller. System controller 106 may communicate with the module controller to obtain the intensity level provided by the radiation sensor, as is further described below.

Figure 6:
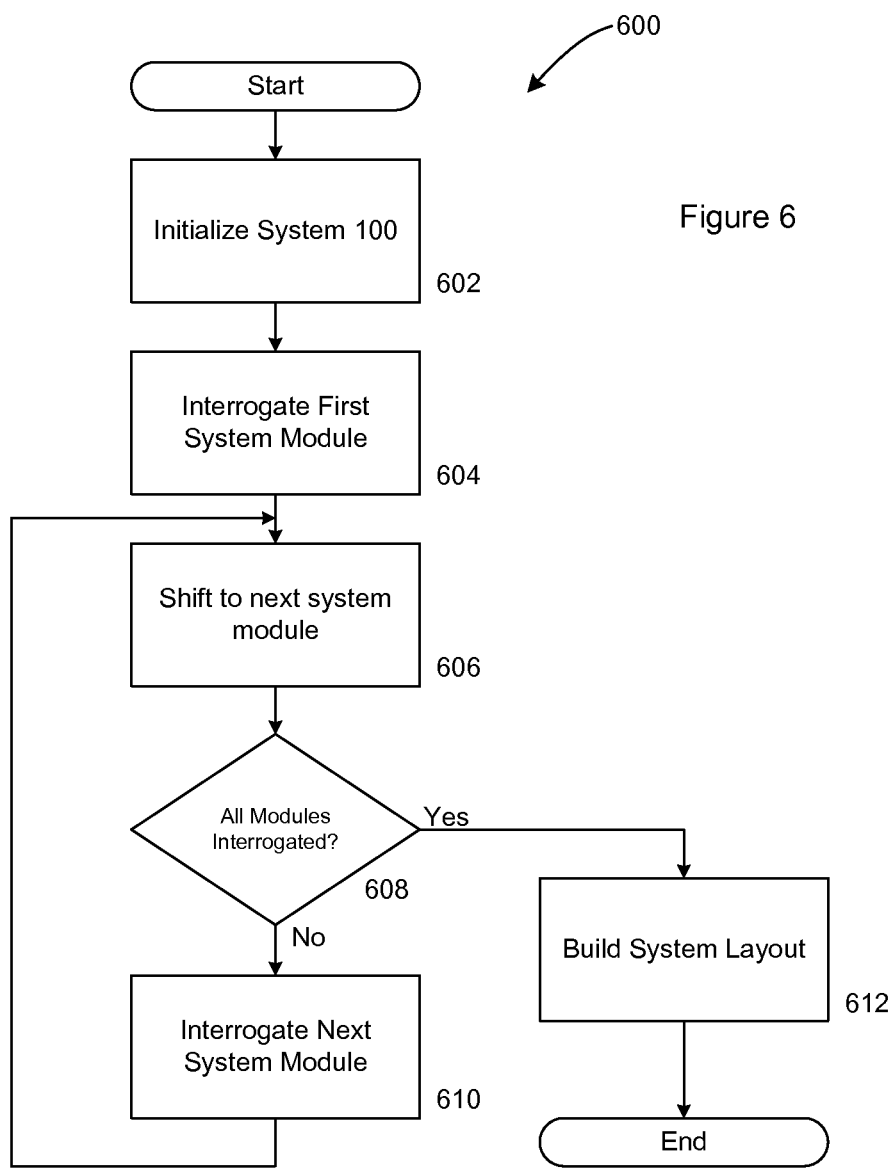
FIG. 6 illustrates a method of determining the arrangement of modules and determining geometric relationships in the system of FIG. 1.

Reference is next made to FIG. 6, which illustrates a method 600, by which system controller 106 determines the arrangement of system modules comprising system 100 and determines geometric relationships between radiation sources and radiation sensors. Method 600 is performed under the control of system controller 106 during a startup phase of system 100. Using method 600, the system controller determines the arrangement of system modules 101 in system 100.

Method 600 begins in step 602, in which system 100 is initialized. This may occur when system 100 is powered up or in response to a "reset" or other command being transmitted across the system communication bus.

In various embodiments, the master controller 106 may address and communicate with module controllers 112 in various manners. For example, each module controller may be assigned or may have a specific address and the master controller may identify each module controller using the corresponding address. For example, the master controller may transmit a module controller's address together with a control instruction, such as an instruction to activate a radiation source.

In system 100, each module controller 112 maintains a one bit shift register, which may be referred to as a module address shift register, to allow the system controller 106 to address the module controller 112. During initialization, each module controller 112, except for module controller 112a, sets its module address shift register to "0". Module controller 112a sets its module address shift register to "1". Module controller 112a may be configured to determine that module 101a is coupled directly to the master controller, and may set its module address shift register to "1" in response to such coupling. Alternatively, the master controller may transmit a control directed to module controller 112a to sets its module address shift register to "1". In system 100, only one system module 101 will have a "1 value in its module address shift register. This module may be referred to as the active module.

As described above, each module controller 112 is coupled to the system communication bus. The master controller 106 can transmit a "shift address bit" instruction on the system communication bus, which is received by all module controllers 112. When this instruction is received, each module controller receives the value previously recorded in the address bit of the immediately upstream system module. When the master controller 106 transmits the shift address bit instruction, the "1" value stored by module controller 101a is shifted to module controller 101b. The "0" values stored by module controllers 101b to 101t are also shifted downstream by one system module so that system modules 101c to 101a (moving counterclockwise or downstream in FIG. 1) have a "0" value in their respective module address shift registers. As the system controller 106 transmits successive shift address bit instructions, each successive downstream system module 101 becomes the active module, until module 101t is the active module. When the next shift address bit instruction is sent, module 101a again becomes the active module.

System controller 106 may transmit various control instructions, data requests and other commands on the system communication bus. Some commands, such as the shift address bit instruction are received and responded to by all of the module controller 112. Some commands may be responded to only by the module controller of the active module.

Method 600 then moves to step 604, in which system controller 106 interrogates the system module 101 to which it is directly connected to determine which type of system module it is. As described above, the module address shift register for module 101a is initially set to "1" which the module address shift registers for all other system modules 101 are set to "0".

System controller 106 transmits a "Transmit Module Information" command, which is responded to only by the active module. Module 101a responds by identifying itself as a corner sensor module 102 is. Module 101a may also provide other information about the module. For example, module 101a may transmit a unique module identifier that distinguishes the module from all other modules in system 100. The unique module identifier may subsequently be used by the system controller 106 to specifically address the module 101a. Some system modules may include an orientation sensor that allows the module to identify the vertical orientation of the module. If module 101a includes such a sensor, module 101a may provide an angle corresponding to its vertical rotation to the master controller 106. Master controller 106 records the module information provided by module 101a.

Method 600 then proceeds to step 606, in which system controller 106 transmits the shift address bit instruction, making system module 101b the active module.

Method 600 then proceeds to decision step 608. If the currently active system module has already been identified by the system controller, indicating that all system modules have been identified, then method 600 proceeds to step 612. Otherwise, method 600 proceeds to step 610.

In step 610, system controller 106 transmits the "Transmit Module Information" command. The active module controller 112 responds by identifying the type of the module and may also provide other information as described above.

Controller 106 receives information about successive system modules in step 604 and then in iterations of step 610.

In system 100, iterations of steps 606-610 continue until each of the system modules 101b-t has been interrogated by system controller 106 in step 610. At the next iteration of step 606, system module 101a becomes the active module and method 600 proceeds from step 606 to step 612.

In step 612, controller 106 builds a system layout based on the type of each successive module and the information recorded in memory 122 about each type of module. Referring again to FIG. 1, radiation sensor 114a is deemed to be located on an x-y plane at point 0,0. Controller 106 is able to determine the position of each radiation sensor 114 and radiation source 126 relative to the x-y plane using the order of successive downstream modules and the recorded information in memory 122.

Some or all of the radiation sources 126 may be visible from each of the radiation sources. For example, radiation sources 126a-c are not visible to radiation sensor 114a, but radiation sources 126d-f and 126k-m are visible to radiation sensor 114a. For each radiation sensor 114, controller 106 determines and records an angle for each radiation source 126 visible to the radiation sensor. In system 101, an angle $\theta$ is recorded for each radiation source relative to radiation sensor 114a, an angle $\phi$ is recorded for each radiation source relative to radiation sensor 114b and an angle $\alpha$ is recorded for each radiation source relative to radiation sensor 114c.

Method 600 then ends.

In addition to addressing the active module, in system 100, system controller 106 can also directly address some or all of the system modules and transmit control instructions and receives data from a particular module, even if it is not the active module. System controller 106 may assign a unique module address to each module as it is initially interrogated in step 604 or 610. Subsequently, the system controller 106 may address each system module by its respective module address.

Figure 7:
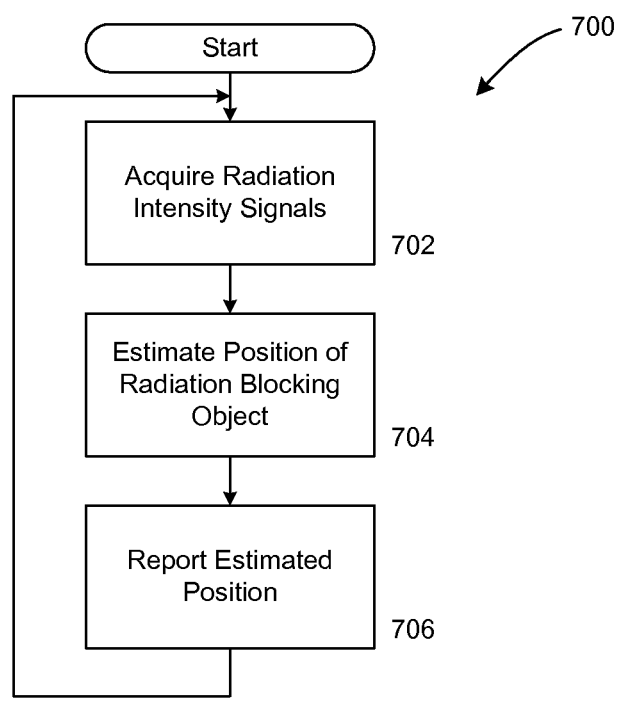
FIG. 7 illustrates a method of identifying the position of a radiation blocking object in the system of FIG. 1.

Reference is next made to FIGS. 1 and 7. Following method 600, system 100 switches to an operational phase in which a method 700 is used to identify the position of a radiation blocking object in the sensing region 108.

Method 700 begins in step 702 in which controller 106 sequentially activates each radiation source beginning with radiation source 126a to radiation source 126z. In system 100, controller 106 does so by making each successive radiation source module 101a to 101n the active module. While each radiation source module is the active module, the module controller of the active module momentarily activates each radiation source sequentially. While each radiation source is activated, the system controller samples the intensity of radiation incident on one or more of the radiation sensors 114. To obtain the radiation intensity level from each sensor, the system controller 106 addresses the module controller of the corresponding system module and requests the radiation intensity level reported by the radiation sensor 114. The module controller samples the radiation sensor 114 and transmits the radiation intensity level to the system controller 106. System controller 106 produces a radiation intensity signal for each radiation sensor 114 corresponding to the radiation intensity level reported by the radiation sensor while each successive radiation source is activated. The operation of radiation sensors 114, the radiation intensity levels and the radiation intensity signals are further explained in U.S. Patent Application No. 61/320,334, which is incorporated herein by reference.

When a radiation blocking object 150 is present in the sensing region 108, the radiation blocking object will attenuate the intensity of radiation that reaches some or all of the radiation sensors 114 from some of the radiation sources 126. The radiation intensity signal will include attenuated radiation intensity levels corresponding radiation sources that are blocked by a radiation blocking object. In FIG. 1, a radiation blocking object 150 attenuates radiation from radiation sources 126*b-c* reaching radiation sensor 114*b*, radiation from radiation sources 126*d-e* reaching radiation sensor 114*c* and radiation from radiation sources 126*g-h* from reaching radiation sensor 114*a*.

When a radiation intensity signal has been obtained for each of the radiation intensity signals, method 700 proceeds to step 704.

In step 704, system controller 106 calculates an estimated position of radiation blocking object 150. System controller 106 calculates an angle of the radiation blocking object 150 relative to at least two of the radiation sensors. For example, for each radiation intensity signal that contains attenuated radiation intensity levels, system controller 106 determines an angle corresponding to the position of the radiation sources for which the radiation intensity level is attenuated. If a group of adjacent radiation intensity levels corresponding to a group of adjacent radiation sources is attenuated, system controller may calculate an angle corresponding to an average or weighted average angular position based on the positions of the attenuated radiation sources. The system controller may be configured to ignore spurious attenuated radiation intensity levels in a radiation intensity signal.

Each angle defines a line originating from its corresponding sensor. System controller 106 then combines the calculated angles to estimate the position ($x_{150}$, $y_{150}$) relative to the x-y plane.

For example, if angles and lines corresponding to two radiation sensors are identified by the system controller, then the position of radiation blocking object 150 may be estimated as the point of intersection between the two lines. If lines corresponding to three radiation sensors are identified by the system controller, such as lines 174, 176 and 178 that respectively originate at radiation sensors 114*a*, 114*b* and 114*c* and pass through or near the position of radiation blocking object 150, the three lines will typically define a triangle. The position of radiation blocking object 150 may be estimated based on the triangle. For example, the position of radiation blocking object 150 may be estimated as a point within the triangle, such as the centroid of the triangle, the center of a circle inscribed within the triangle, the point at which the sum of the distances from the point to the sides of the triangle is minimized, the point at the sum or the squares of the distances from the point to the sides of the triangle is minimized, the center of a circle that intersects the circumscribes the triangle. Various other geometric techniques may be used to estimate the position of radiation blocking object 150. Various methods for calculating such angles and for combining a pair of such angles are described in United States Patent Application No. 61/320,334. The system controller 106 calculates the estimated position ($x_{150}$, $y_{150}$) of the radiation blocking object according to one of these techniques or another technique.

Method 700 then moves to step 706. In step 706, system controller 106 reports the estimated position ($x_{150}$, $y_{150}$) at interface 124.

Method 700 then returns to step 702.

Method 702-706 are performed repeatedly. With each iteration, an updated position ($x_{150}$, $y_{150}$) corresponding to the position of the radiation blocking object 150 is reported at interface 124. An external device, such as a computer, coupled to interface 124 may receive the successive positions. System 100 acts as an input device for such an external device.

Sensing region 108 may overly an underlying surface as mentioned above. In some embodiments, the sensing region may overlies a display system formed with a matrix of display screens. In such an embodiment, the edge modules 104 used for horizontal and vertical sides of the system may be of different lengths. For example, in some embodiments, a display system formed of a matrix of display screens that have a size of 40 cm wide×30 cm high. The edge modules 104 may be sized to correspond to the edge lengths. Edge modules used along the width of each display screen may be 40 cm long while edge modules used along the height of each display screen may be 30 cm long.

In system 100, the sensing region 108 is enclosed by the system modules 101. Processor 120 may access the dimensions and position of each radiation source or radiation sensor in each system module 101 from the information recorded in memory 122. As the system controller 106 obtains the sequence of system modules 101, the processor 120 can determine the position of each radiation source 126 and radiation sensor 114 using the recorded information. In other embodiments, the position of each radiation source and radiation sensor may be manually recorded in memory 122. In addition, the dimensions, sequence and interconnection of system modules may be manually recorded in memory 122.

In system 100, edge spacer modules 104*o* are used to complete the system communication bus between other system modules 101, and also to ensure that the positions of radiation sensors and radiation sources in other system modules can be accurately calculated by the processor 120. In other embodiments, modules may be interconnected with cables or other means, with no system modules provided where no radiation source or radiation sensor is provided.

In some embodiments, the sensing region may be only partially enclosed by the system modules.

Figure 8:
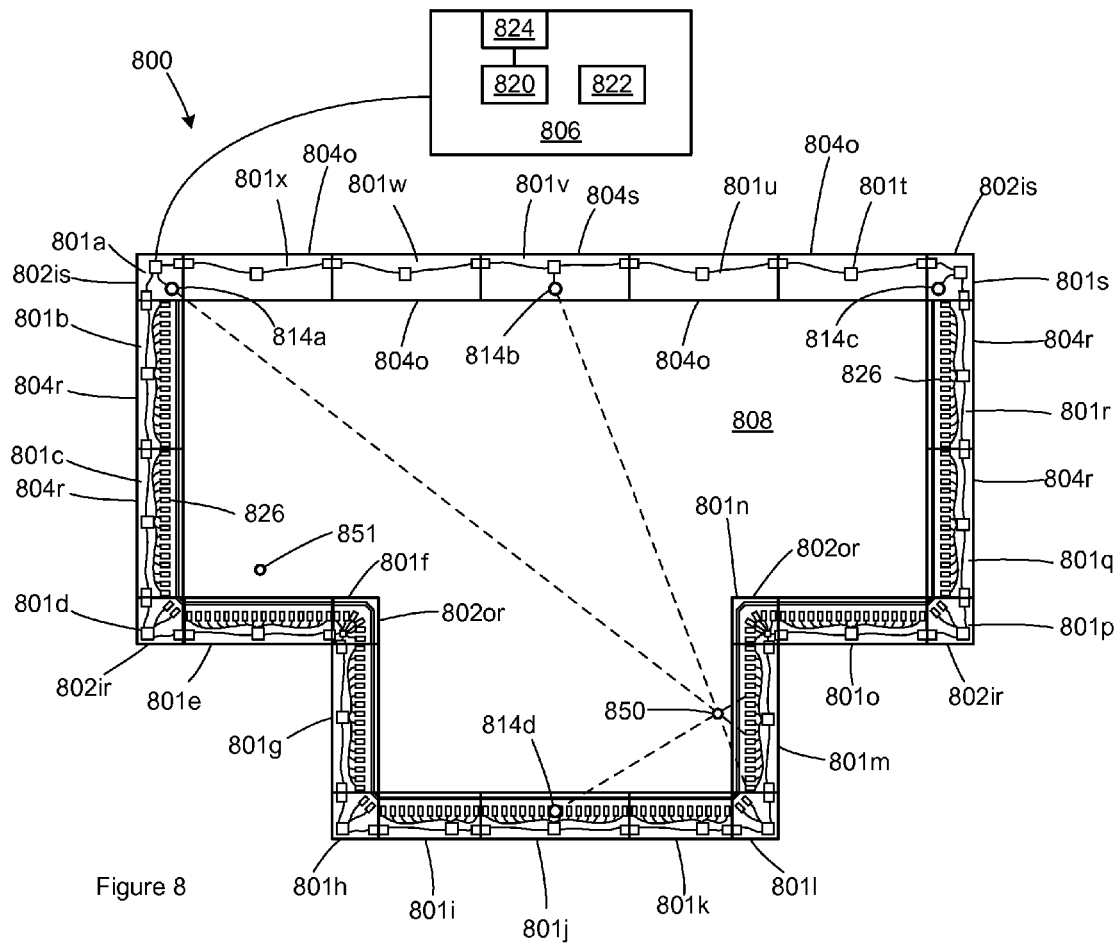
FIG. 8 illustrates another example modular position sensing system.

Reference is next made to FIG. 8, which illustrates another modular position sensing system 800. System 800 is similar to system 100 and corresponding components are identified by similar reference numerals.

System 800 includes a plurality of system modules 801*a*-801*x* that are coupled together as described above in relation to system 100. System 800 includes two types of modules not illustrated in system 100 (FIG. 1): Outside corner radiation source module 802 or and edge radiation source/sensor module 804*rs*.

Figure 9:
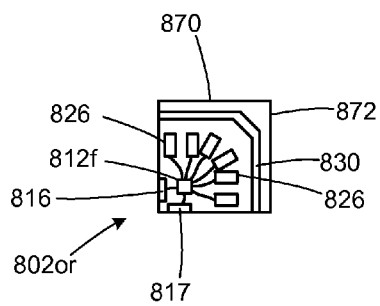
FIG. 9 illustrates an outside corner radiation source module of the system of FIG. 8.

Referring to FIGS. 8 and 9, system modules 801*f* and 801*n* are outside corner radiation source modules 802 or. Each outside corner radiation source module 802 or allows a 270° turn in the frame 860 formed by the system modules 801. Each outside corner radiation source module 802 or includes a module controller 812*f*, a plurality of radiation sources 826, an upstream inter-module connector 816, a downstream inter-module connector 817 and a diffuser 830.

The module controller 812*f* is coupled to and operates each of the radiation sources 826 as described above. The inter-module connectors 816 and 817 couple the module controller 812 to adjacent system modules 801, as described above.

Module 802 or has two sides 870 and 872 that face sensing region 808. Radiation sources 826 are arranged to emit radiation through diffuser 830 across sides 870 and 872 and the corner between those sides.

The sensing region 808 is generally "T" shaped. Some areas of the sensing region 808 are not visible to radiation sensors 814*a* and 814*c* in each of corner radiation sensor modules 801*a* and 801*s*. For example, radiation blocking object 850 is not visible from corner radiation sensor module 801*s*.

Figure 10:
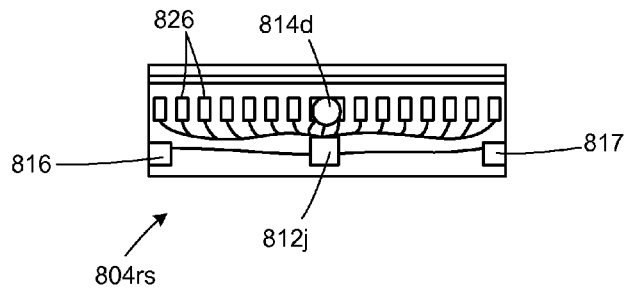
FIG. 10 illustrates an edge radiation source/sensor module of the system of FIG. 8.

Reference is made to FIG. 10, which illustrates edge radiation source/sensor module 804*rs*. Edge radiation source/sensor module 804*rs* is similar to an edge radiation source module 804*r* and additionally includes a radiation sensor 814*d*.

Radiation sensor 814*d* is coupled to module controller 812*j*, which operates the radiation sources 826 in the edge radiation source/sensor module 804*rs* as described above in relation to edge radiation source module 101*b* (FIG. 2), and operates radiation sensor 814*d* as described above in relation to edge sensor module 101*r* (FIG. 5). Edge radiation source/sensor module 804*rs* combines the operations of a radiation source module and a radiation sensor module. Radiation sensor 814*d* is positioned above several of the radiation sources 826. In other embodiments of a combined radiation source/sensor module, the radiation sensor may be positioned in the same plane as the radiation sources, or above or below the plane of the radiation sources.

Referring to FIG. 8, system 800 includes edge radiation source modules 804*r* of different sizes. Modules 801*i* and 801*k* are edge radiation source modules with a shorter length than other edge radiation source modules, such as edge radiation source modules 801*b*. In any particular embodiment, a variety of edge and corner modules may be used. Each edge or corner module may contain one or more radiation sources, one or more radiation sensors, which may be spaced in any arrangement. The structure of each type of type of module is recorded in memory 822, including the physical dimensions of each module and the position of each radiation source and radiation sensor within the module. For each corner module, the recorded data includes the angle between the upstream and downstream inter-module connectors. For example, the outside corner radiation source modules 802 or have a 270° angle (in a clockwise direction) between the adjacent upstream module and the adjacent downstream module (i.e. modules 801*e* and 801*g* in the case of outside corner radiation source module 801*f*).

In other embodiments, corner modules may have other angular relationships at any angle between their upstream and downstream sides, including angles that are not square or multiples of 90°. In some embodiments, corner modules may have variable angles that may be measured by sensor built into the module, and which are then reported to the system controller 806. In some embodiment, the inside corner of a corner module (i.e. a corner that points into the sensing region 808) may be rounded.

System controller 806 uses method 600 (FIG. 6) to determine the arrangement of system modules 801 in system 800, when system 800 is initialized. System controller 806 interrogates each system module 801 to obtain the arrangement of the various types of modules and uses the arrangement of the modules, together with the information recorded in memory 822 about each type of module to build a geometric system layout for the system. For each radiation sensor 814, system controller 806 determines and records an angle (or some corresponding data) for each radiation source 826 that is visible to the radiation sensor 814.

System controller 806 uses method 700 (FIG. 7) to estimate the position of radiation blocking objects in the sensing region 808. Depending on the position of a radiation blocking object, it may block the path of radiation between different combinations of radiation sources 126 and radiation sensors 814. System controller 806 iteratively performs steps 702-706 to acquire radiation intensity signal corresponding to each radiation sensors, identifies radiation sources that are attenuated in each of the radiation intensity signals and estimate the positions of one or more radiation blocking objects corresponding to positions of the attenuated radiation sources. The specific radiation intensity signal used to estimate the position of a particular radiation blocking object may depend on the position of the radiation blocking object in the sensing region 808. For example, the position of radiation blocking object 850 may be estimated by identifying a point at or near the intersection of lines 874, 876 and 878. Line 874 corresponds to the path of radiation between radiation source 826*a* and radiation sensor 814*a*. Line 876 corresponds to the path of radiation between radiation source 826*b* and radiation sensor 814*b*. Line 878 corresponds to the path of radiation between radiation source 826*c* and radiation sensor 814*d*. There is no unobstructed linear path between any radiation source and radiation sensor 814*c* that passes through radiation blocking object 850. For example, the linear path between radiation source 826 in module 801*k* and radiation sensor 814*c* is obstructed by module 801*n*. As radiation blocking object 850 is moved about the sensing region 808 it will block the radiation path between different combinations of radiation sources and radiation sensors. For example, if radiation blocking object 850 is moved to position 851, it will not be visible to radiation sensor 814*d* (that is, there will be no unobstructed linear path between a radiation source and radiation sensor 814*d* that also passes through position 851).

System controller 806 estimates the position of the radiation blocking object in the sensing region 808 relative to two or more radiation sensors based on the blocked paths between various radiation sources and the two or more radiation sensors, as described above in relation to step 704 of method 700.

Figure 11:
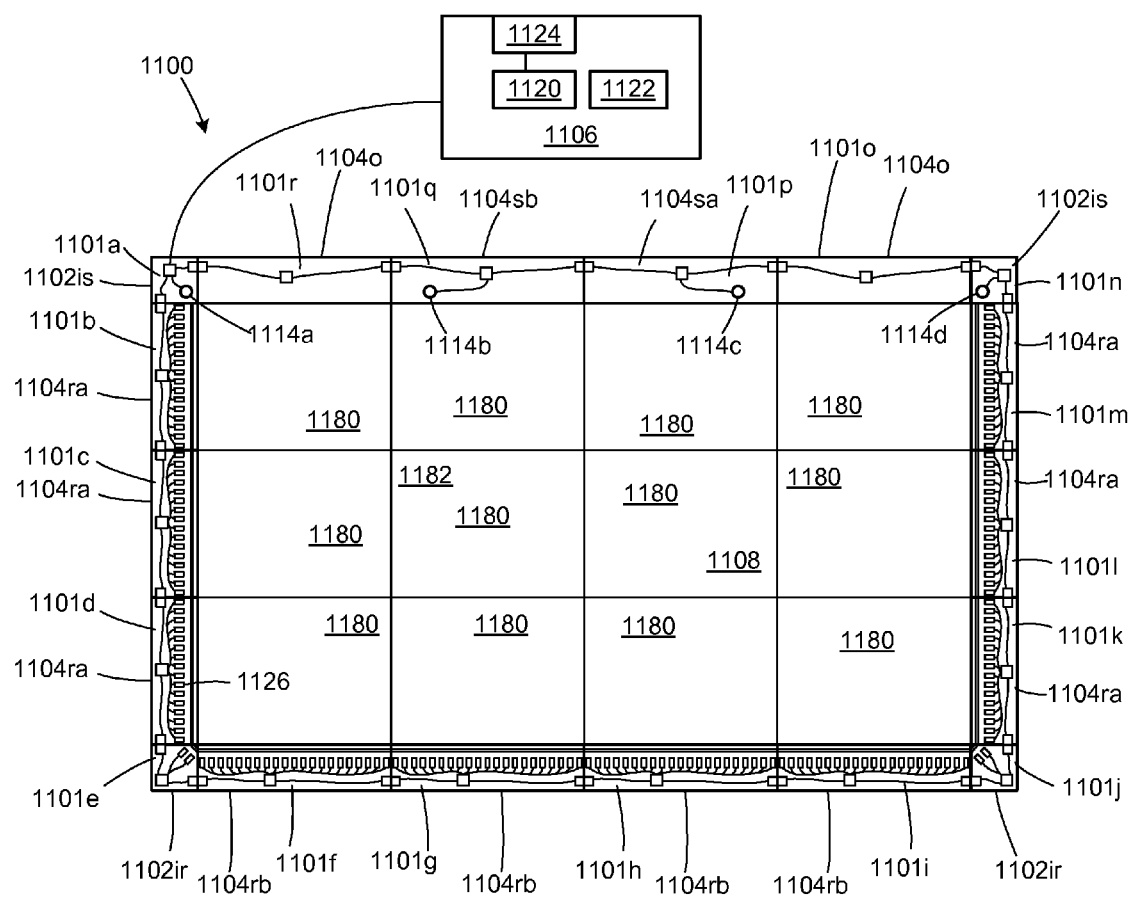
FIG. 11 illustrates another example modular position sensing system.

Reference is made to FIG. 11, which illustrates another modular position sensing system 1100. System 1100 is similar to system 100 and corresponding components are identified by corresponding reference numerals.

The sensing region 1108 overlies a surface comprised of an array of display modules 1180 that together form a display screen 1182. Display screen 1182 may be coupled to an external device such a computer. Typically, both the modular position sensing system 1100 and the display screen 1182 will be coupled to the same external device (not shown) such as a computer or computing device. The external device may receive input information relating to the position of radiation blocking objects in the sensing region 1108 (and on the surface of the display screen 1182). The external device may control the display screen such that information corresponding to the input information is displayed on the display screen. In some embodiments, information displayed on the display screen may be registered (i.e. positionally synchronized or aligned) with inputs received from the modular position sensing system.

As illustrated in FIG. 11, the lengths of the different edge modules 104 may be matched to the dimensions of the display modules 1180. Edge modules 1104*ra* are shorter than edge modules 1104*rb* and edge modules 1104*o*, 1104*sa*, 1104*sb*. In other embodiments, the lengths of the display modules may be of different lengths than the dimensions of the display modules.

In system, corner sensor modules 1102*is* and edge modules 1104*sa* and 1104*sb* include a total of four radiation sensors 1114. Depending on the position of a radiation blocking object in the sensing region 1108, radiation intensity signals from different radiation sensors may be used by the system controller 1106 to estimate the position of the radiation blocking object.

Figure 12:
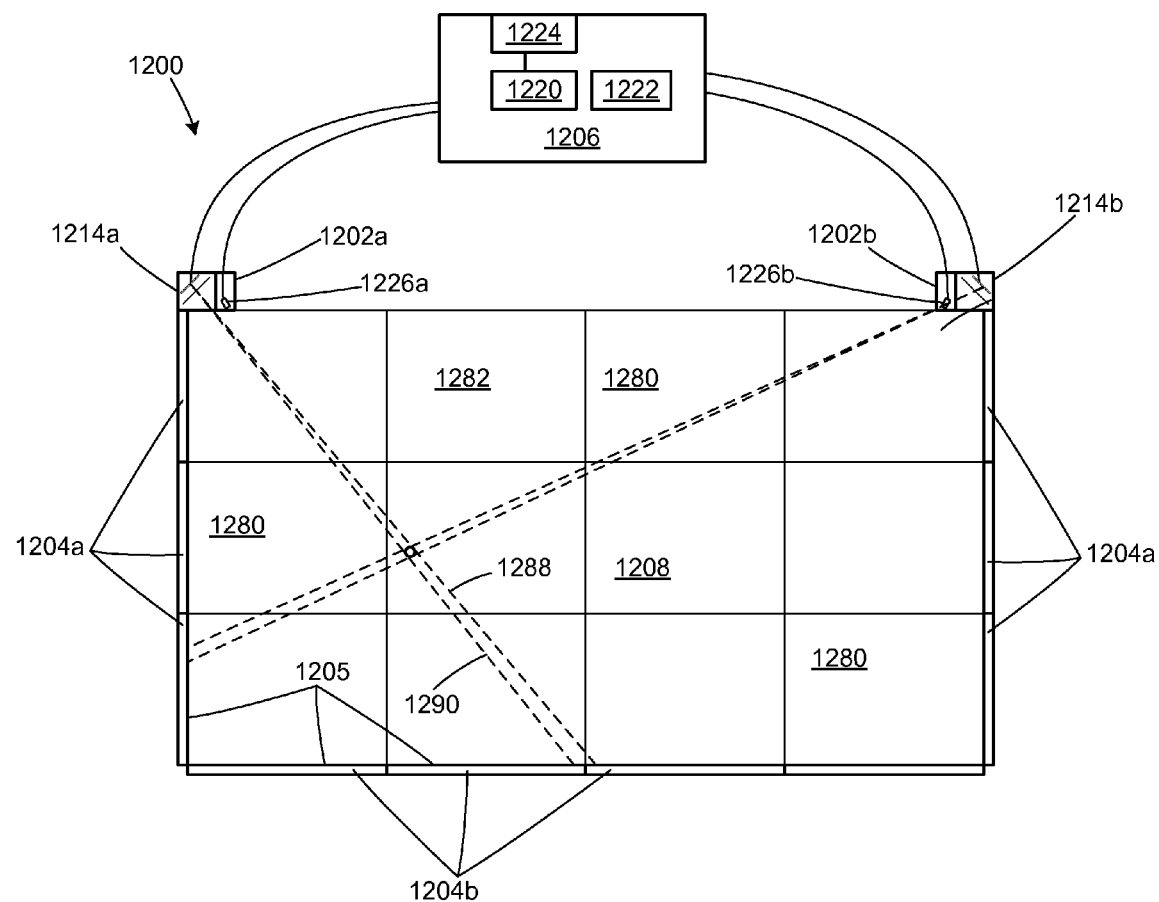
FIG. 12 illustrates yet another example modular position sensing system.

Reference is next made to FIG. 12, which illustrates another modular position sensing system 1200. Components of system 1200 that are similar to components of the systems described above are identified by similar reference numerals. System 1200 includes a plurality of radiation source modules 1202, a plurality of reflector modules 1204 and a pair of radiation sensor modules 1214. In this embodiments, the modules are mounted at the edges of a sensing region 1208 which overlies a display screen 1282 formed of an array of display modules 1280.

The lengths of reflector modules 1204a and 1204b are respectively sized to correspond to the adjacent lengths of the display modules 1280.

Each radiation source module 1202 includes a radiation source 1226 that emits radiation across sensing region 1208. Each reflector module 1204 has an inner surface 1205 that reflects radiation emitted from a radiation source towards at least one of the radiation sensor modules 1214. The inner surface in essence becomes a source of radiation that can be sensed by the radiation sensor modules 1214. The radiation sensor modules 1214 sense the reflected radiation. Each radiation source 1226 and each radiation sensor are coupled to the system controller 1206, which controls their operation.

In this embodiment, radiation source module 1214a is paired with radiation sensor module 1214a and radiation source module 1214b is paired with radiation sensor module 1214b. System controller 1206 alternately activates radiation sources 1226a and 1226b.

When a radiation source 1226 is activated, it emits radiation across the sensing region such that the radiation reaches some of the inner surfaces 1205 of the reflector modules. Radiation is reflected from inner surfaces towards the radiation sensor module 1214 corresponding to the active radiation source 1226.

This reflection of radiation back in the direction from the radiation originated may be referred to as "retroreflection". A surface that exhibits this characteristic may be referred to as retroreflective. Many surfaces are at least slightly retroreflective and so long as sufficient radiation is reflected from an inner surface 1205 to allow the reflected radiation to be sensed by the radiation sensor module 1214, no special treatment of the inner surface is required. In some embodiments, the inner surface 1205 of the reflector modules 1204 may be shaped, coated or otherwise adapted to enhance the retroreflectivity of the inner surface. For example, the inner surface may have a retro-reflective profile or coating. In some embodiments, the inner surface may have a triangular, curved or other profile that enhances the reflection of radiation in the direction from which the radiation was incident on the inner surface. In some embodiments, the inner surface may be coated with a highly reflective or retroreflective film or paint. In some embodiments, optical elements such as lens (selected to reflect the radiation emitted by the radiation sources) may be used to enhance the reflectivity of the inner surface.

When each radiation source is activated, system controller receives a radiation intensity signal from the corresponding radiation sensor module 1214. If a radiation blocking object, such as radiation blocking object 1250 is present in the sensing region, the radiation reflected from some portion of the inner surfaces 1205 will be blocked from reaching the radiation sensor module 1214.

Figure 13:
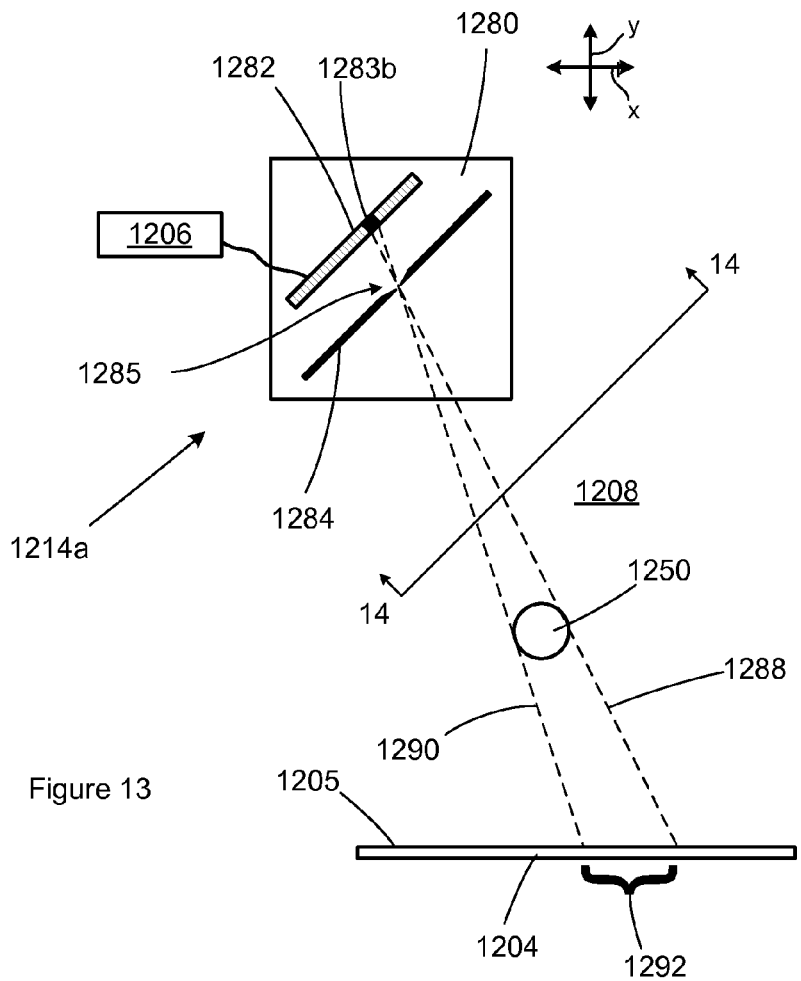
FIGS. 13 and 14 illustrate a radiation sensor module of the system of FIG. 12.
Figure 14:
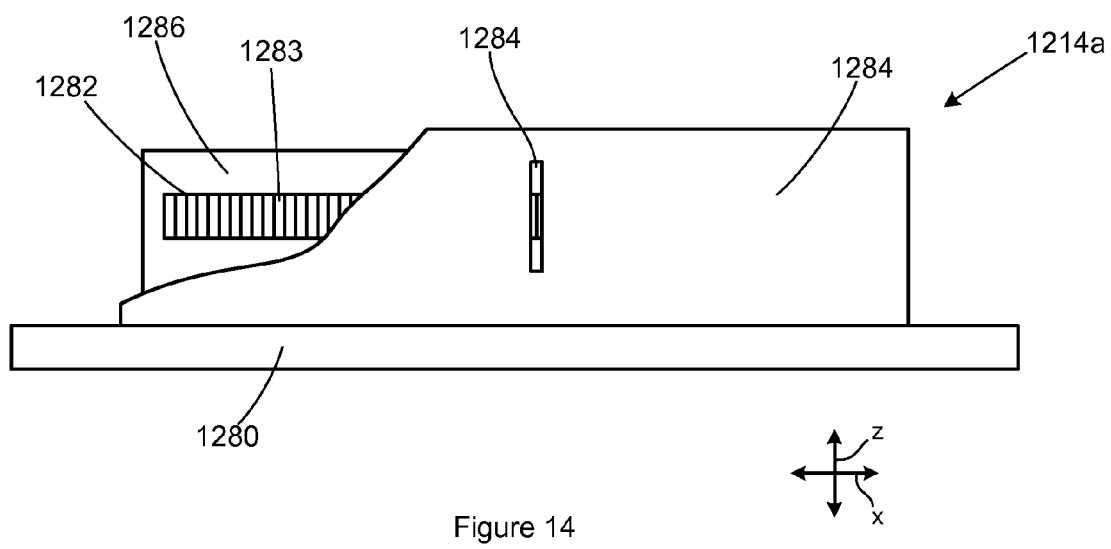

Referring to FIGS. 13 and 14, an example radiation sensor module 1214a is illustrated. Other radiation sensors suitable for use in system 1200 are described in co-pending PCT patent application No. PCT/CA2010/000884, which is incorporated herein by this reference.

Module 1214a includes a linear array sensor 1282 and an aperture plate 1284. Linear array sensor is coupled to processor 1206. Linear sensor array 1282 is mounted on a sensor support 1286, which is in turn mounted on a base plate 1280. The aperture plate 1284 is also mounted on base plate 1280.

Array sensor 1282 has a plurality of sensor elements 1283 that are arranged linearly, generally parallel to the reflector modules 1204. Each of the sensor elements 1283 is sensitive to radiation reflected from an inner surface 1205 of a reflector module 1204. Sensor array 1282 provides a radiation intensity signal to the processor 1206 corresponding to the intensity of radiation incident on each sensor element 1283.

Aperture plate 1284 has an aperture 1285 formed in it such that radiation reflected from the inner surface 1205 must pass through the aperture 1285 to reach the sensor elements 1283. In this embodiment, aperture 1285 is a slit. In other embodiments, the aperture may be a hole or may have another shape. In some embodiments, the shape (including the size) of the aperture may be selected based on the sensitivity, shape and spacing of the sensor elements 1283.

As radiation blocking object 1250 moves in the x or y dimensions in the sensing region 1208 relative to sensor module 1214a, radiation reflected from different portions of the inner surface 1205 is blocked from reaching some of the sensor elements 1283. In FIG. 13, a range of sensor elements at 1283b are wholly or partially in the shadow of the radiation blocking object 1250. These sensor elements correspond to radiation reflected from inner surface 1205 between lines 1288 and 1290, and portion 1292 of inner surface 1205. Portions of the radiation intensity signal provided by the sensor array 1282 corresponding to sensor elements 1283b reflect the reduced radiation levels incident on those sensor elements.

Referring again to FIG. 12, the dimensions of the components of system 1200 are recorded in memory 1222 and are accessible to processor 1120. For example, the dimensions of system 1200 itself, the position and orientation of each reflector module 1204 and the position and orientation of radiation sensor module 1214 is recorded in memory 1222.

Processor 1220 combines the radiation intensity signal from the sensor array 1282 in radiation sensor module 1214a with these recorded dimensions, positions and orientations to estimate the direction of radiation blocking object 1250 relative to radiation sensor module 1214a. Processor 1220 identifies one or more sensor elements 1283 in the radiation intensity signal upon which radiation has been blocked by radiation blocking object 1250 and identifies a direction corresponding to this range sensor elements. For example, processor may calculate a ray originating from radiation sensor module 1204 extending between lines 1288 and 1290. Similarly, processor 1220 combines a radiation intensity signal from radiation sensor module 1204b with the recorded data to estimate a ray corresponding to the radiation blocking object 1250 relative to module 1204b. Processor 1220 estimates the position of the radiation blocking object 1250 to be at or near the intersection of the two rays. The estimated position may be reported to an external device at interface 1224.

Other modular position sensing systems according to the present invention may include a variety of other types modules. For example, other systems may include curved modules, or modules that can be adjusted to take different shapes, modules that contain any number or radiation sources or radiation sensor or both, radiation sources or radiation sensors that are spaced apart by any distance or varying distances. The sensing region in any particular embodiment may have any shape.

In some embodiments, such as systems 100 and 800, radiation sources and radiation sensor may be positioned such that the sensing region includes substantially all or most of the area enclosed within the system's frame. In other embodiments, the radiation sources and radiation sensors may be positioned in the frame such that the sensing region in which the position of a radiation blocking object may be sensed extends across only a part of the area enclosed within the frame.

In some embodiments, there may be gaps between modules such that the frame surrounding the sensing region (and possibly areas that are not part of the sensing region) are not continuous.

In the systems described above, the system controller is coupled to each module in a daisy-chain sequential fashion. In other embodiments, the system controller may be directly coupled to some or all of the modules and may communicate with the respective module controller directly rather than through other module controllers or through a system communication bus. In some embodiments, the system controller may communicate with some or all of the modules through a wireless communication system rather than through a wired communication system.

Various example embodiments of the present invention have been described here by way of example only. Various modification and variations may be made to these exemplary embodiments without departing from the spirit and scope of the invention.

We claim:

1. A method of operating a modular position sensing system, the method comprising:
    providing a set of system modules adjacent to a sensing region;
    determining the positions of a plurality of radiation sources mounted to at least some of the system modules;
    determining the position of two or more radiations sensors mounted to at least one of the system modules;
    assembling a radiation intensity signal corresponding to each of the radiation sensors; and
    estimating the position of a radiation blocking object based on the radiation intensity signals.

2. The method of claim 1 wherein determining the positions of the radiation sources includes determining the positions of one or more system modules and determining the positions of radiation sources mounted to those system modules based on dimensions of at least some of the system modules.

3. The method of claim 1 wherein determining the positions of the radiation sensors includes determining the positions of one or more system modules and determining the positions of radiation sensors mounted to those system modules based on dimensions of at least some of the system modules.

4. The method of claim 1 including sequentially determining an order in which the system modules are coupled together and determining the positions of the radiation sources and the radiation sensors in accordance with the order of the system modules.

5. The method of claim 1 wherein each radiation intensity signal corresponding to a radiation sensor is assembled by sequentially sampling a radiation intensity level from the radiation sensor while at least some of the radiation sources are sequentially activated.

6. The method of claim 1 wherein the radiation intensity signals are assembled contemporaneously.

7. The method of claim 1 wherein the radiation intensity signals are assembled sequentially.

8. The method of claim 7 wherein a first radiation intensity signal corresponding to the first radiation sensor is assembled and then a second radiation intensity signal corresponding to the second radiation sensor.

9. The method of claim 1 wherein at least one of the radiation sources is activated separately at different intensities to generate a radiation intensity signal corresponding to a first radiation sensor and a radiation intensity signal corresponding to the second radiation sensor.

10. The method of claim 1 further comprising coupling an external device to the system controller at an interface.

11. The method of claim 10 further comprising reporting the position of the one or more radiation blocking objects to the external device.

* * * * *